United States Patent
Neubauer et al.

(10) Patent No.: US 9,895,637 B2
(45) Date of Patent: Feb. 20, 2018

(54) FILTER MEDIUM OF A FILTER ELEMENT, FILTER ELEMENT AND METHOD FOR PRODUCING A FILTER MEDIUM

(75) Inventors: Sebastian Neubauer, Marbach (DE); Jochen Reyinger, Waiblingen (DE); Heiko Wyhler, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 905 days.

(21) Appl. No.: 13/612,724

(22) Filed: Sep. 12, 2012

(65) Prior Publication Data
US 2013/0001155 A1   Jan. 3, 2013

Related U.S. Application Data

(63) Continuation of application No. PCT/EP2011/053635, filed on Mar. 10, 2011.

(30) Foreign Application Priority Data

Mar. 12, 2010  (DE) .................. 10 2010 011 396
Mar. 15, 2010  (DE) .................. 10 2010 011 512

(51) Int. Cl.
*B01D 39/16*   (2006.01)
*B01D 39/20*   (2006.01)
*B01D 39/18*   (2006.01)

(52) U.S. Cl.
CPC ......... *B01D 39/1623* (2013.01); *B01D 39/18* (2013.01); *B01D 39/2017* (2013.01);
(Continued)

(58) Field of Classification Search
CPC ........ D04H 5/00–5/12; B01D 39/1623; B01D 39/1607; B01D 39/16; B01D 39/14;
(Continued)

(56) References Cited

U.S. PATENT DOCUMENTS 3,158,532 A * 11/1964 Pall .................... B01D 39/2013
                                                          162/102
3,210,229 A * 10/1965 Feine ................... B01D 17/045
                                                          138/141
(Continued)

FOREIGN PATENT DOCUMENTS

CN   1284007 A    2/2001
DE   69304222     4/1997
(Continued)

OTHER PUBLICATIONS

Monofilament conversion table by SWICOFIL, No Date http://www.swicofil.com/companyinfo/manualmonofilconversiontable.html.*
(Continued)

*Primary Examiner* — David C Mellon
*Assistant Examiner* — Liam Royce
(74) *Attorney, Agent, or Firm* — James Hasselbeck

(57) ABSTRACT

A filter medium of a filter element for filtering a fluid has at least one nonwoven filter layer of synthetic individual fibers. The filter layer has an increasing level of compression in a flow direction of a fluid passing through the filter medium. The filter medium has a degree of separation for particles to be filtered that increases in the flow direction of the fluid through the filter medium. The filter medium is used in a filter element for filtering fluids such as fuel or air. In a method for producing the filter medium, the synthetic fibers are deposited on a support surface in such a way that an increasing level of compression is created in a direction toward the support surface by gravity and suction acting on the fibers.

9 Claims, 1 Drawing Sheet

(52) U.S. Cl.
CPC ................ *B01D 2239/065* (2013.01); *B01D 2239/0622* (2013.01); *B01D 2239/1225* (2013.01); *B01D 2239/1233* (2013.01)

(58) Field of Classification Search
CPC ............... B01D 39/08; B01D 39/2017; B01D 39/2003; B01D 39/20; B01D 39/18; B01D 2239/0622; B01D 2239/0604; B01D 2239/06; B01D 2239/065; B01D 39/1615; B01D 2239/1233; B01D 2239/1225

See application file for complete search history.

(56) References Cited

U.S. PATENT DOCUMENTS

| | | | |
|---|---|---|---|
| 4,018,646 A * | 4/1977 | Ruffo | D21H 5/2642 162/146 |
| 5,472,600 A * | 12/1995 | Ellefson | B01D 39/083 210/317 |
| 5,480,464 A | 1/1996 | Villiers et al. | |
| 5,639,541 A * | 6/1997 | Adam | B32B 5/26 210/922 |
| 5,685,757 A * | 11/1997 | Kirsch | D04H 5/06 428/903 |
| 5,806,154 A * | 9/1998 | Tolbert | A41D 31/02 28/103 |
| 6,169,045 B1 | 1/2001 | Pike | |
| 6,183,670 B1 * | 2/2001 | Torobin | B01D 39/1623 156/167 |
| 6,315,806 B1 | 11/2001 | Torobin et al. | |
| 6,387,141 B1 | 5/2002 | Hollingsworth | |
| 7,137,510 B1 | 11/2006 | Klein et al. | |
| 7,465,685 B2 | 12/2008 | Le Brech et al. | |
| 2003/0106293 A1 | 6/2003 | Tanaka et al. | |
| 2003/0150199 A1 | 8/2003 | Tanaka et al. | |
| 2006/0266701 A1 | 11/2006 | Dickerson et al. | |
| 2008/0203602 A1 | 8/2008 | Riedel et al. | |

FOREIGN PATENT DOCUMENTS

| | | |
|---|---|---|
| DE | 19843000 A1 | 4/2000 |
| DE | 10011569 | 9/2001 |
| DE | 20207663 | 9/2002 |
| DE | 102005037671 | 1/2007 |
| DE | 112006001428 | 5/2008 |
| JP | 6443324 A | 2/1989 |
| JP | 05220313 A | 8/1993 |
| JP | 06254321 A | 9/1994 |
| JP | 08209521 A | 8/1996 |
| WO | WO03/020401 | 3/2003 |

OTHER PUBLICATIONS

PCT serach report of parent application PCT/EP2011/053635.
DPMA (German) Office action of priority DE 10 2010 011 512.6.

* cited by examiner

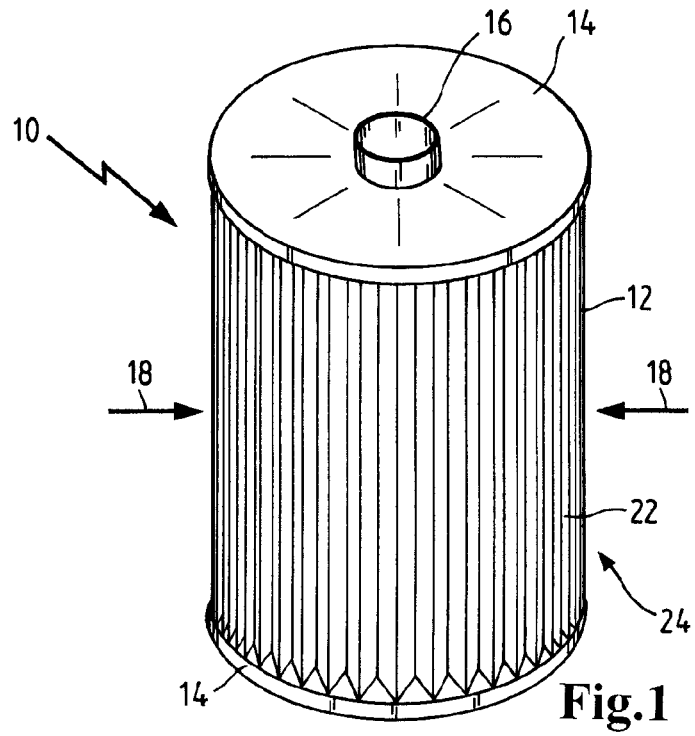
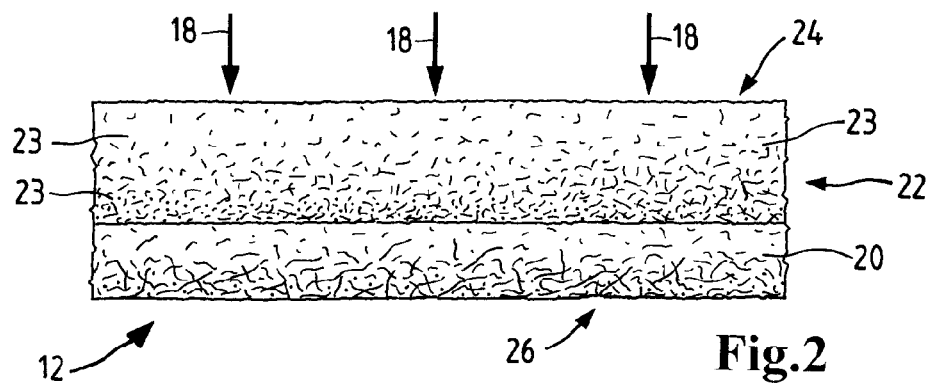
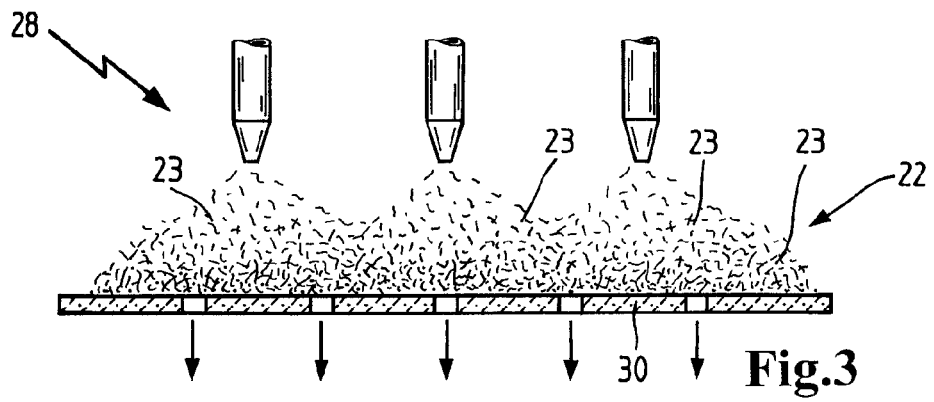

FILTER MEDIUM OF A FILTER ELEMENT, FILTER ELEMENT AND METHOD FOR PRODUCING A FILTER MEDIUM

CROSS REFERENCE TO RELATED APPLICATIONS

This application is a Bypass Continuation of International Application PCT/EP2011/053635 filed Mar. 10, 2011 designating the United States of America, and which is hereby incorporated by reference in its entirety. This application claims the benefit under 35 USC 119 of foreign application 10 2010 011 396.4 filed in Germany on Mar. 12, 2010 and further claims the benefit under 35 USC 119 of foreign application 10 2010 011 512.6 filed in Germany on Mar. 15, 2010. German applications 10 2010 011 396.4 and 10 2010 011 512.6 are hereby incorporated by reference in their entirety.

TECHNICAL FIELD

The invention concerns a filter medium of a filter element for filtering a fluid, in particular a liquid fuel, water, motor oil, or air, in particular of an internal combustion engine of a motor vehicle, comprising at least one nonwoven filter layer of synthetic individual fibers, wherein the filter medium has a degree of separation for the particles to be filtered from the fluid that increases in the flow direction of the fluid.

Moreover, the invention concerns a filter element for filtering a fluid, in particular a liquid fuel, water, motor oil, or air, in particular of an internal combustion engine of a motor vehicle, with a filter medium with at least one nonwoven filter layer of synthetic individual fibers, wherein the filter medium has a degree of separation for the particles to be filtered from the fluid that increases in the flow direction of the fluid.

Also, the invention concerns a method for producing a filter medium, in particular a filter element for filtering a fluid, in particular a liquid fuel, water, motor oil, or air, in particular of an internal combustion engine of a motor vehicle, in which synthetic individual fibers are deposited in an areal (flat) arrangement and on top of each other on a support surface for forming a filter layer.

BACKGROUND OF THE INVENTION

WO 99/26710 discloses a filter element in which in the flow direction several layers of a filter medium are joined to each other. For improving the total particle retaining capacity for a given filter fineness or for increasing the filter fineness for a given particle retaining capacity, the filter fineness increases in the flow direction of the fluid from individual layer to the next individual layer. Upon blocking of the surface of one of the individual layers by the separated particles, a differential pressure between the inflow side and the outflow side of the filter medium surpasses a maximum permissible value so that the filter medium must be exchanged.

SUMMARY OF THE INVENTION

An object of the present invention is to design a filter medium, a filter element, and a method of the aforementioned kind in such a way that the filtering action as a whole is improved and can be maintained for an extended period of time and that in particular blocking of the surface is prevented or at least is delayed as much as possible.

This object is solved according to the invention in that the filter layer has a level of compression that increases in the flow direction of the fluid. The level of compression corresponds to the porosity of a filter material which is determined by the ratio of hollow space volume to total volume of a volumetric unit of a filter material to be examined, i.e., the porosity has a value between 0 and 1. According to the invention, the filter layer thus has a porosity that decreases in the flow direction of the fluid. For determining the porosity or the level of compression, for example, a cross-sectional image of the filter layer can be recorded by means of a scanning electron microscope. By digitizing the recorded image into black areas (fiber adjoins immediately the section plane) and white areas (no immediately adjoining fiber) and subsequent evaluation of the ratio of black and white image proportions, the level of compression or porosity can be determined in sections of the filter layer that are sequentially arranged along the flow direction of the fluid.

According to the invention, a depth-dependent gradient structure of the level of compression of the filter layer is realized so that in a single layer in the flow direction a continuous transition from a coarse filter range (low level of compression, high porosity) into a fine filter range (high level of compression, low porosity) is achieved. For this purpose, the level of compression of the filter layer increases advantageously steadily in the flow direction of the fluid. According to the invention, with one and the same filter material in one layer it is possible to provide a degree of separation for the particles to be filtered out that increases in the flow direction.

The degree of separation indicates the proportion of particles which are separated by filtration at the filter medium. The degree of separation is in particular dependent on the particle size distribution in the fluid to be filtered. Therefore, the determination of the degree of separation, also referred to as filter efficiency, separating degree or filter fineness, as a function of the use of the filter medium is determined by international standards (e.g. ISO 4020 as well as ISO 19438 relating to fuel filters, ISO 5011 relating to air filters). In the standardized determination of the degree of separation, the latter is determined for the filter medium as a whole and not for individual intermediate layers of the filter medium or for a single filter layer of a composite of filter layers. In the case of the instant invention, the filter medium or the filter layer therefore has an increasing fictitious degree of separation in the flow direction of the fluid. The fictitious degree of separation represents the degree of separation of an intermediate layer of the filter layer that results when a filter medium with the properties of this intermediate layer, but for a certain uniform layer thickness of, for example, 1 mm, is examined isolated.

Advantageously according to the invention, the entire volume of the filter layer is available for the depth filtration. The particle retaining capacity of the filter layer is thus not limited by the retaining capacity at the surface, but, instead, is determined by the retaining capacity of the entire volume of the filter layer. The differential pressure between inflow side and outflow side of the filter layer increases at a significantly greater particle loading in comparison to filter media that are known in the art in which the particle retaining capacity is limited by the surface filtration. Therefore, significantly higher particle holding (retaining) capacities and longer service life can be realized as compared to filter media known in the art.

In an advantageous embodiment, at least one filter layer, in particular the filter layer whose level of compression increases in the flow direction is comprised of a meltblown nonwoven. Meltblown nonwovens are comprised of individual fibers or many endless fibers that have a relatively minimal fiber diameter so that a relatively large porosity of the meltblown nonwoven is achieved. Meltblown nonwovens have a very high storage capacity for the particles to be filtered out from the fluid while having a minimal flow resistance for the fluid to be filtered. Meltblown nonwovens can also be compressed simply in a depth-dependent manner. Usually, meltblown nonwovens are produced by a meltblown method in which endless fibers produced from melted plastic material are swirled immediately after exiting from a nozzle by means of air flow and are deposited on a support surface, for example, a conveying device, so that a nonwoven is produced.

Advantageously, the filter layer can be comprised of a single layer of a mixture of individual fibers with different diameters and/or lengths and the level of compression of the layer continuously increases in the flow direction. This has the advantage that the filter layer can be produced simply in a single working step. No complex layering process is required in which the individual fibers with different diameters and/or lengths must be layered on top of each other in a controlled fashion.

Preferably, the fiber diameter distribution of the individual fibers of the fiber layer whose level of compression increases in the flow direction is at least substantially constant at least in the flow direction of the fluid. The fiber diameter distribution can be determined e.g. in accordance with the method disclosed in DE 10 2009 043 273 A1.

Advantageously, the filter layer can be comprised of a mixture of individual fibers with a diameter between approximately 50 nm and approximately 8 micrometer, in particular with a mean diameter of approximately 1 micrometer to approximately 2 micrometer. The arithmetic mean is used as mean diameter which, for example, can be determined by means of the method described in DE 10 2009 043 273 A1. Such fiber sizes enable an optimal ratio of flow resistance and filter action. In this way, optimal small differential pressures between the inflow side of the filter medium and the outflow side of the filter medium can be achieved.

In an especially preferred embodiment of the invention, the filter layer whose level of compression increases in the flow direction is comprised of endless fibers or so-called filaments.

One invention variant is characterized by a simple manufacturing process in which the filter layer whose level of compression increases in the flow direction is comprised of individual fibers of the same material.

In practice, embodiments have been found to be beneficial in which the individual fibers of the fiber layer, whose level of compression increases in the flow direction, are made of polyamide, polyester, in particular polybutylene terephthalate, or polypropylene.

In a further advantageous embodiment, the at least one filter layer can be joined flat (face resting on face) to a second, in particular cellulose-containing and/or glass fiber-containing, layer. Advantageously, the two layers with regard to their degree of separation are matched to each other such that both layers reach approximately at the same time their capacity limit relative to particle loading. None of the two individual layers delimits therefore by itself the particle retaining capacity of the filter medium. The volumes of both layers are used optimally and completely for filtration. This improves the filter action and increases the service life of the filter medium. In this way, an optimal ratio of the particle retaining capacity to the total volume of the filter medium can be achieved. Accordingly, with same performance data a filter with a significantly reduced size or, for a given size, a performance increase of the filter can be realized.

Advantageously, the at least one filter layer can be arranged at the inflow side and the second layer at the outflow side. As a second layer, a medium can be used that is denser and mechanically more stable in comparison to that of the first filter layer. The second layer can thus act as a fine filter and can also provide a support function. In case of the filter layer at the inflow side, the shape stability of this filter layer is not important. The inflow-side filter layer can be designed to be optimally loose and permeable; this significantly improves the depth filtration. The second layer can also have a level of compression that increases in the flow direction or a level of compression that is constant in the flow direction.

Moreover, the object is solved for the filter element in accordance with the invention in that the filter layer has a level of compression that increases in the flow direction. The aforementioned advantages of the filter medium according to the invention apply likewise to the filter element according to the invention.

With regard to the method, the object is solved according to the invention in that the side of the filter layer that is facing away from the support surface is configured as the inflow side for the fluid to be filtered and the side of the filter layer that is facing the support surface is configured as the outflow side for the fluid to be filtered in that the filter layer is compressed by means compression forces that increase in the direction toward the support surface in such a way that the filter layer has a level of compression that increases in the flow direction.

According to the invention, in a single working process, in particular by a meltblown manufacturing process, the filter layer is realized to have a gradient with respect to compression. It is not required to arrange in a complex method several layers of individual fibers with different fiber distributions, in particular fiber length and/or fiber diameter. With the requirements according to the invention in regard to the orientation of the filter layer in the flow direction, an increase of the total particle retaining capacity of the filter medium by more than 100% in comparison to the prior art filter media can be achieved. The compressing forces increasing toward the support surface can be realized in particular by the air flows from the meltblowing nozzles caused by the meltblowing process as well as optionally by additional metered supply of heated air and by means of the weight force of the individual fibers on top. The spatially lower areas of the filter layer are compressed by the filter fibers resting on top. The deeper the areas are positioned, the greater the forces acting on the individual fibers. Alternatively or in addition, other compression forces can be realized also which act on the individual fibers at the future outflow side of the filter medium more strongly than on the individual fibers at the future inflow side and, in this way, effect at the outflow side an increased level of compression. In particular, the increasing level of compression or the decreasing porosity of the filter layer is not generated by introduction of entanglement of the individual fibers in an additional working step, such as waterjet treatment.

In another advantageous embodiment of the method, the individual fibers can be sucked by a suction effect toward the support surface. The suction force acts more strongly on the individual fibers in the vicinity of the support surface so that they are subjected to an increased compression. The suction forces acting on the individual fibers decrease with increasing distance from the support surface so that a continuous compression gradient across the thickness of the filter layer can be achieved.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1 schematically depicts a filter element with a zigzag-folded filter medium;

FIG. 2 schematically depicts a section of the two-layer filter medium of the filter element of FIG. 1 in which a meltblown layer is joined to a cellulose layer wherein the meltblown layer has a level of compression increasing in the flow direction of the fluid; and FIG. 3 schematically depicts a support belt for producing the meltblown layer of the filter medium of FIGS. 1 and 2.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in A filter medium of a filter element, a filter element having the medium and a method or producing the filter medium. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a filter element 10 of a fuel filter, no further details being illustrated, for diesel fuel of an internal combustion engine of a motor vehicle.

The filter element 10 includes a two-part filter medium 12 which is folded in a zigzag shape and shaped to a cylinder. To the end faces of the cylindrically shaped filter medium 12 an end disk 14 is attached, respectively. The upper end disk 14 of FIG. 1 has centrally an outlet socket 16 for the fuel to be filtered. In operation the fluid to be filtered flows through the filter medium 12 in flow direction, indicated in FIG. 1 by arrow 18, in radial direction from the exterior to the interior. The clean (filtered) side is located within the filter element 10, the raw (unfiltered) side is outside of the filter element 10, viewed in radial direction.

The filter medium 12 is shown in section in FIG. 2. It is comprised of a cellulose layer 20, in FIG. 2 shown at the bottom; a nonwoven meltblown layer 22, shown in FIG. 2 at the top, adjoins areally (flat) the layer 20. The meltblown layer 22 which is comprised of a meltblown nonwoven forms relative to the flow direction 18 an inflow side 24 of the filter medium 12 for the fuel to be filtered. The inflow side 24 is thus facing the raw side. The cellulose layer 20 forms an outflow side 26 of the filter medium 12 that is facing the clean side. The meltblown layer 22 is preferably of a thickness of 0.4 to 2 mm.

The meltblown layer 22 is comprised of a single layer of a mixture of synthetic individual fibers 23 with different diameters and lengths. The diameters vary between 50 nm and approximately 8 micrometer. The mean diameter of the fiber distribution is between approximately 1 micrometer and approximately 2 micrometer. The individual fibers 23 are made of the same material and represent endless fibers or filaments that are produced from polyamide, polyester, in particular polybutylene terephthalate, or polypropylene. The fiber diameter distribution of the individual fibers 23 is constant across the entire meltblown layer 22.

The meltblown layer 22 has an increasing level of compression in the flow direction 18. The individual fibers 23 of the fiber mixture in the flow direction 18 are more densely packed. In this way, a degree of separation that increases in the flow direction 18 is achieved for the particles to be separated.

In operation, the filter element 10 is flowed through in radial direction from the exterior to the interior by the fuel to be filtered. Because the level of compression of the meltblown layer 22 increases in the flow direction 18, the particles contained in the fuel to be filtered are separated by depth filtration across the entire volume of the meltblown layer 22. A premature blocking at the surface of the meltblown layer 22 is thus avoided. By uniform loading of the meltblown layer 22 with particles an increase of the differential pressure between the inflow side 24 and the outflow side 26 is optimally delayed. Extensive measurements have shown that the total particle retaining capacity in comparison to prior art filter media that are comparable with respect to surface area and thickness is increased by more than 100%.

The cellulose layer 20, like the meltblown layer 22, is characterized by an increasing level of compression in the flow direction 18. The particle retaining capacity of the meltblown layer 22 and of the cellulose layer 20 are matched to each other such that they will reach at the same time the level of saturation at which point surface filtration occurs.

The volume of both individual layers are thus utilized completely for depth filtration, respectively.

For producing the filter element 10, first the meltblown layer 22 is produced in the form of a nonwoven.

In FIG. 3, a device 28 for producing the meltblown layer 22 is illustrated. The device 28 comprises a support surface which is formed by a grid-shaped substantially horizontally extending support belt 30 which is provided with a suction action at the bottom side in a way that is not of interest in this context.

The mixture of synthetic individual fibers 23 is applied in a way not of interest in this context across the surface area and on top of each other onto the support belt 30. They vacuum or suction action of the support belt 30 has the effect that the individual fibers 23 are pulled against the support belt 30. The individual fibers 23 closer to the support 30 are subjected to a greater suction action than the individual fibers 23 farther removed from the belt 30. Gravity causes additionally the fibers 23 that are on top to press the fibers 23 positioned farther down against the belt 30. As a whole, gravity and suction, both increasing with increasing depth of the meltblown layer 22, cause the meltblown layer 20 to be subjected to a steadily increasing compression in the direction toward the support belt 30.

The meltblown layer 22 is subsequently joined to the cellulose layer 20 such that the face of the meltblown layer 20 that used to face the support belt 30 and is compressed the most is now facing the cellulose layer 20.

The completed filter medium 12 is subsequently folded in a zigzag shape, in a way not of interest in this context, is then cylindrically shaped, and closed in circumferential direction. The end disks 14 are mounted on the end faces of the folded filter medium 12.

In the aforementioned embodiment of a filter element 10, a filter medium 12, and a method for producing the filter medium 12, inter-alia the following modifications are possible.

The invention is not limited to the use in fuel filters, in particular in diesel fuel filters. Instead, it can also be used for different types of filters, filter elements 10 or filter media 12 for filtration of other fluids, e.g. a different kind of liquid fuel, water, motor oil, or air. Instead of being used in connection with internal combustion engines of motor vehicles, they can also be used in other technical fields, for example, in industrial motors, compressors or in water technology.

The filter medium 12, instead of being folded in a zigzag shape and then formed to a circumferentially closed cylinder, can also be realized in a different shape. For example, the filter medium 12 can also be used in a flat arrangement or folded in connection with square/rectangular filter elements.

The filter element 10 can also be designed such that it is flowed through in radial direction from the interior to the exterior; in this case, the meltblown layer 22 is to be arranged at the inner side with respect to the radial direction.

The meltblown layer 22 can also be realized with a mixture of individual fibers 23 with a diameter of less than 50 nm or more than 8 micrometers. The mean diameter of the individual fibers 23 can also be smaller than 1 micrometer or greater than 2 micrometers.

Instead of the cellulose layer 20, also a different layer, for example, a glass fiber-containing layer or a different type of meltblown layer, can be provided that preferably also predefines the shape of the filter medium 12 and/or acts as a support for the meltblown layer 22.

The filter medium 12 according to the invention, instead of being made of the meltblown layer 22 and the cellulose layer 20, can also be comprised only of the meltblown layer 22. However, it is also possible to provide more than one meltblown layer 22 and/or more than one cellulose layer 20.

The meltblown layer 22, instead of being provided at the inflow side 24 of the filter medium 12, can also be arranged at the outflow side 26. In this case, the second layer, in particular a cellulose layer which is arranged at the inflow side is to be selected such that it has a reduced degree of separation in comparison to the meltblown layer 22.

As an alternative or in addition to the suction action at the bottom of the support belt 30, the gradient structure of the level of compression of the meltblown layer 22 can also be improved in a different way. For example, a type of centrifuge can be used also wherein at the inner wall the individual fibers 23 are deposited and by centrifugal force the inwardly positioned individual fibers 23 are forced against the outwardly positioned individual fibers 23 in radial direction.

The meltblown layer 22, instead of being produced separate from the cellulose layer 20 on the support belt 30, can also be directly deposited on the cellulose layer 20. For example, the cellulose layer 20 can be subjected to suction action in order to improve the increase of the level of compression of the meltblown layer 22 in the flow direction 18.

The cellulose layer 20, instead of having a level of compression that increases in the flow direction 18, can also have a constant level of compression in the flow direction 18. It can also be designed as an ultrafine filter layer.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter medium of a filter element for filtering a fluid, the filter medium comprising:
    at least one first filter layer in the form of a nonwoven of synthetic individual fibers, individual nonwoven synthetic fibers having a length and diameter;
    wherein the nonwoven synthetic individual fibers have a fiber diameter distribution;
    the at least one first filter layer having a first level of fiber compression that increases in a flow direction of a fluid passing through the at least one filter layer;
    wherein the at least one first filter layer has a first degree of separation for particles to be filtered that increases in the flow direction of the fluid through the filter medium, the degrees of separation, as used herein, known as filter efficiency, separating degree or filter fineness and is a function of the use of the filter medium determined by international standards ISO 4020, ISO 19438 relating to fuel filters, ISO 5011 relating to air filters;
    wherein the at least one first filter layer is comprised of a mixture of the individual nonwoven synthetic fibers with different lengths, the mixture of the individual nonwoven synthetic fibers, each fiber having a diameter falling within either of: between approximately 250 nm to approximately 500 nm, or between 4 micrometers and 8 micrometers;

a second filter layer is a support layer directly contacting and covering an outflow side of the at least one first filter layer and supporting the at least one first filter layer thereon;

wherein the second filter layer is a cellulose fiber layer or a glass fiber layer, the second fiber layer having a second level of fiber compression that increases in a flow direction of a fluid passing through the second filter layer;

wherein the second filter layer has a second degree of separation for particles to be filtered that increases in the flow direction of the fluid through the second filter layer;

wherein the first degree of separation is substantially matched to the second degree of separation such that the at least one first layer and the second layer reach approximately at the same time their capacity limit relative to particle loading, such that the layers provide together a particle retaining capacity of the filter medium, thereby distributing particle load through the filter medium, such that the at least one filter layer, by itself, does not delimit the particle retaining capacity of the filter medium;

wherein the second filter layer predefines a shape of the filter medium;

wherein a level of fiber compression of the first filter layer and in the second filter layer increases steadily in the flow direction, the flow direction being from the first filter layer to the second filter layer.

2. The filter medium according to claim 1, wherein the at least one first filter layer is comprised of a meltblown nonwoven.

3. The filter medium according to claim 1, wherein the fiber diameter distribution of the individual fibers of the at least one first filter layer is substantially constant at least in the flow direction.

4. The filter medium according to claim 1, wherein the at least one first filter layer is comprised of endless fibers.

5. The filter medium according to claim 1, wherein the at least one first filter layer is made of synthetic fibers of the same material.

6. The filter medium according to claim 1, wherein the individual nonwoven synthetic fibers of the at least one first filter layer comprise nonwoven polypropylene synthetic fibers.

7. The filter medium according to claim 1, wherein the individual nonwoven synthetic fibers of the at least one first filter layer comprise nonwoven polyester synthetic fibers.

8. The filter medium according to claim 1, wherein the individual nonwoven synthetic fibers of the at least one first filter layer comprise nonwoven polypropylene synthetic fibers.

9. The filter medium according to claim 1, wherein the individual nonwoven synthetic fibers of the at least one first filter layer comprise nonwoven polyester synthetic fibers.

* * * * *